United States Patent [19]

Chatterjee

[11] Patent Number: 5,064,878
[45] Date of Patent: Nov. 12, 1991

[54] IN-REACTOR STABILIZATION OF POLYMERS VIA COATED STABILIZERS

[75] Inventor: Ananda M. Chatterjee, Houston, Tex.

[73] Assignee: Shell Oil Company, Houston, Tex.

[21] Appl. No.: 492,044

[22] Filed: Mar. 12, 1990

Related U.S. Application Data

[62] Division of Ser. No. 376,266, Jul. 5, 1989, abandoned.

[51] Int. Cl.$^5$ .......................... C08K 9/10; C08F 4/642; C08F 2/34
[52] U.S. Cl. ...................................... 523/205; 526/90; 526/125; 526/187; 526/901; 523/330; 523/333
[58] Field of Search ............... 523/200, 330, 333, 205; 526/90, 125, 187, 901

[56] References Cited

U.S. PATENT DOCUMENTS

| 3,089,824 | 5/1963 | Wurster | 167/82 |
|---|---|---|---|
| 3,243,395 | 3/1966 | Guillet et al. | 260/28.5 |
| 3,271,185 | 9/1966 | Pollock | 117/100 |
| 3,271,340 | 9/1966 | Shearer et al. | 260/28.5 |
| 3,485,812 | 12/1969 | Anspon et al. | 260/94.9 |
| 3,546,150 | 12/1970 | White et al. | 260/28.5 |
| 3,591,409 | 7/1971 | Aubrey et al. | 117/100 |
| 3,971,749 | 7/1976 | Blunt | 260/33.4 |
| 3,977,992 | 8/1976 | Hofacker | 252/316 |
| 3,985,840 | 10/1976 | Hofacker | 264/4 |
| 4,002,458 | 1/1977 | Hofacker | 71/27 |
| 4,098,945 | 7/1978 | Oekmke | 428/327 |
| 4,224,422 | 9/1980 | Rude et al. | 525/454 |
| 4,277,288 | 7/1981 | Lawrence et al. | 106/309 |
| 4,299,885 | 11/1981 | Sahajpal et al. | 428/403 |
| 4,306,993 | 12/1981 | Danielson et al. | 252/316 |
| 4,329,253 | 5/1982 | Goodall et al. | 252/429 |
| 4,382,326 | 5/1983 | Rabuse | 29/270 |
| 4,414,132 | 11/1983 | Goodall et al. | 502/169 |
| 4,659,506 | 4/1987 | Nakamura et al. | 252/399 |
| 4,853,426 | 8/1989 | Chatterjee | 526/79 |
| 4,855,209 | 8/1989 | Martin et al. | 430/126 |

FOREIGN PATENT DOCUMENTS 56021815 7/1979 Japan .

OTHER PUBLICATIONS

H. S. Hall and R. E. Pondell, Chap. 7, "Controlled Release Technologies: Methods, Theory and Applications", vol. II, A. F. Kydonieus, Ed. CRC Press, Boca Raton, FL 1980.

Primary Examiner—Joseph L. Schofer
Assistant Examiner—Tom Weber

[57] ABSTRACT

The present invention includes:
(i) a method for making a coated particulate comprising the steps of
  forming a polyolefin emulsion or dispersion;
  fluidizing additive particles;
  spraying the emulsion or dispersion on the fluidized additive particles; and
  forming discrete substantially coated additive particles;
(ii) a coated particulate made by the above process; and
(iii) a process for providing in-reactor stabilization of a polyolefin during a polymerization reaction using the coated additives prepared by the above described method.

7 Claims, No Drawings

IN-REACTOR STABILIZATION OF POLYMERS VIA COATED STABILIZERS

This is a division, of application Ser. No. 376,266, filed July 5, 1989, now abandoned.

BACKGROUND OF THE INVENTION

The method traditionally employed for incorporating additives into polymers involved first polymerizing the monomer and then adding stabilizers to the polymer by extrusion or other melt mixing techniques, thereby producing pellets. Stabilizers have traditionally not been added into the polymerization reactor because neat stabilizers usually deactivate the polymerization catalyst and terminate the polymerization reaction. Disadvantages of the current melt mixing techniques include an appreciable downtime for cleaning of the blending equipment, heat sensitivity of some additives, and pelletization problems, particularly with very high melt flow (>100 g/10 min) polypropylene resins.

A variety of patents teach methods for blending additives with polymers. One such patent is U.S. Pat. No. 3,591,409. Patent '409 teaches a method for preparing a polymer composition by high intensity blending of a mixture of particulate thermoplastic resin, hydrocarbon wax, and particulate solid additive at high temperatures. This teaching requires that all ingredients be placed in the mixer at once, without the separate pretreatment of any one of the components of the mixture.

In contrast with this conventional teaching, it has been discovered that by adding discrete particles to the reactor during polymerization (wherein the particles consist of a core of additive surrounded by a polymer wax), good yield of stabilized polymer can result. A variety of patents teach methods for making discrete particles or capsules containing different kinds of fill materials. U.S. Pat. No. 4,306,993 to Minnesota Mining & Manufacturing Company discloses a method for making microcapsules which can be used to tag books, paper currency and especially explosives and explosive devices. Other discrete particle preparation techniques are disclosed in the following patents: DT 2,160,852 which discloses microcapsules containing wetting agents, and U.S. Pat. No. 4,224,422 which discloses a curable epoxy resin system useful as an adhesive, wherein the curable one part system comprises a rupturable impermeable microcapsule having shell walls of a crosslinked interfacial polyurethane-polyether reaction product of an aromatic polyisocyanate. U.S. Pat. No. 4,382,326 describes acrylate copolymer microsphere structures using glycerol and cycloaliphatic polyepoxides filled with a liquid Lewis acid-glycerol complex. Tacky spherical acrylate copolymer particles are disclosed in Minnesota Mining & Manufacturing Company's U.S. Pat. No. 4,098,945. Patent '945 teaches a liquid-filled capsule having a microporous capsule wall made of a dispersed solid-phase and a continuous phase, wherein the capsule forms a single phase in the liquid state but separate phases when cooled to solid, and wherein the volume contraction ratio is greater than or equal to 1.2. The preferred capsules are spherical and the wall is made of the solid, semi-crystalline polyolefin, an amorphous hydrocarbon resin and an at least partially crystalline wax capable of separating out as a discontinuous mass.

Liquid-filled capsules for controlled release of fertilizers having a microporous wall of semi-crystalline polyolefin, hydrocarbon resin and a wax are disclosed in U.S. Pat. No. 4,002,458. U.S. Pat. No. 3,985,840 describes microspheres prepared by forming a homogeneous molten liquid phase using a solid semi-crystalline polyolefin, a hydrocarbon resin and at least partially crystalline wax, and wherein the liquid phase is allowed to cool and the wax separates out as a discontinuous mass dispersed throughout the matrix. U.S. Pat. No. 3,977,992 discloses a controlled release capsule prepared from 2% wax, 5% hydrocarbon resin and the remainder of semi-crystalline polyolefin such as polyethylene.

Since it has long been desired to find a method of cheaply blending stabilizers, antioxidants and other additives into polymers in the reactor without compounding or extruding, such that these additives are dispersed throughout the polymer, a novel invention has been developed. Since it has been desired to achieve a method of blending additives into polymers, without resorting to a process requiring the use of solvents, the present invention was developed. This invention relates to the preparation of coated additives that can act as antioxidant and/or stabilizer and which can be incorporated into a polymer during polymerization on short notice and with good efficiency.

This invention is an improvement over my prior invention described in Ser. No. 147,953, filed Jan. 25, 1988, now U.S. Pat. No. 4,853,426 as it extends the technology of coating additives to low melting additives. Both high melting and low melting additives can be used according to this invention. In my prior invention molten polyolefin wax is sprayed onto a fluidized bed of solid additives. For relatively low melting additives this method of coating will not be operable because the additives will melt in the bed. This limitation has now been overcome via use of an aqueous emulsion of polyolefin which will be sprayed onto the fluidized bed of additives. The water rapidly evaporates in the fluidized bed leaving a coating of polyolefin on the additives. The coated additive particles can then be added to a olefin polymerization reactor producing polymer which already has the additives incorporated. This new invention represents a lower temperature coating operation and thereby is lower in energy cost compared to my prior invention.

The production of additive-containing polymer directly from the reactor will eliminate the extrusion pelletization step currently used to incorporate additives. This reduced thermal history will increase the oxidative stability of the polymer.

SUMMARY OF THE INVENTION

The present invention includes:

(i) a method for producing a coated particulate comprising the steps of
   fluidizing (with a gas) additive particles selected from the group comprising a hindered phenolic antioxidant, a processing stabilizer, an acid acceptor, other additives, and mixtures thereof;
   spraying a polyolefin emulsion or dispersion on the fluidized additive particles; and
   forming discrete substantially coated additive particles;

(ii) a coated particulate made by the process described above; and (iii) a process for providing in-reactor stabilization of a polymer during polymerization using the coated additives prepared by the method described above.

Additives introduced directly to polymerization reactors deactivate the catalyst and thereby stop the polymerization. When propylene polymerization was attempted with Irganox 3114 (antioxidant) and ZnO (acid acceptor) directly added to the reactor, no polymer was produced.

It is preferred that these substantially coated particles have diameters ranging from about 100 to about 8000 micrometers. It is preferred that the additive usable herein be a member of the group including antioxidants like 1,3,5-trimethyl-2,4,6-tris(3,5-di-tert-butyl-4-hydroxybenzyl) benzene (A); octadecyl 3-(3', 5'-di-tert-butyl-4'-hydroxyphenyl) propionate (B); tetrakis[-methylene (3,5-di-tert-butyl-4-hydroxyhydrocinnamate)] methane (C); tris[3,5-di-t-butyl-4-hydroxybenzyl) isocyanurate (D); 3,5-di-tert-butyl-4-hydroxyhydrocinnamic acid triester with 1,3,5-tris(2-hydroxyethyl)-s-triazine-2,4,6(1H,3H,5H)-trione (E); 1,3,5-tris(4-tert-butyl-3-hydroxy-2,6-dimethylbenzyl) 1,3,5-triazine-2,4,6-(1H,3H, 5H)-trione (F); bis-[3,3-bis(4'hydroxy-3'tert-butyl-phenyl)-butanoic acid]-glycolester (G); 2,2'-methylene-bis-(4-methyl-6-tertiary-butylphenol)-terephthalate (H); and 2,2-bis[4-(2-(3,5-di-tert-butyl-4-hydroxyhydrocinnamoyloxy)) ethoxy-phenyl]propane (I), calcium bis[monoethyl(3,5-di-tert-butyl-4-hydroxybenzyl)phosphonate] (J); 1,2-bis(3,5-di-tert-butyl-4-hydroxyhydrocinnamoyl)hydrazine (K) and 2,2'-oxamido bis[ethyl3-(3,5-di-tert-butyl-4-hydroxyphenyl)propionate] (L). Additional additives which may be used separately or blended with the above listed antioxidants, may include processing stabilizers like phosphites, phosphonite; acid acceptors like metallic stearates, metal oxides, hydrotalcites (e.g., Kyowa Chemical Industries' DHT-4A and DHT-4C); nucleating agents; lubricants, antistatic agents; fillers like barium sulfate, clays, calcium carbonate, silicates, pigments, such as titanium dioxide, zinc oxide, lead chromate, cadmium sulfides, cadmium selenide, zinc sulfide, basic carbonate of white lead; stabilizers such as tribasic lead sulfate, basic lead chlorosilicate, dibutyl tin oxide and other salts of lead, zinc, cadmium, tin, and the like; flame retardants such as antimony oxide; ultra-violet stabilizers, slip agents, anti-block agents, and other solid additives which enhance the properties and processability of the polyolefin to which they are added.

In preferred embodiments, the coating (from the polyolefin emulsion or dispersion) can be polyolefin such as polypropylene wax (including chemically modified polypropylene wax or a mixture thereof). In a preferred embodiment, the fluidized additive particles to be coated, are heated to a temperature between about 25° C. and about 60° C. because at higher temperature relatively lower melting additives will melt, and thereby not be coatable.

The coated particulate of the present invention consists essentially of a core of at least one additive, such as those identified above, wherein the core is coated with a polyolefin which is solid at polymerization temperature. In a preferred embodiment, the polymer coating consists of at least about 15% to about 85% by weight of the particle, wherein the percentages are based on the total composition of the particle.

The process for providing in-reactor stabilization of a polymer of the present invention comprises:
(i) forming a particualate adapted for use in olefin polymerization reactions, by the steps consisting of
  forming a polyolefin emulsion or dispersion;
  fluidizing (with a gas) additive particles selected from the group comprising of an antioxidant, a processing stabilizer, and acid acceptor, and mixtures thereof;
  spraying the polyolefin emulsion or dispersion on the fluidized additive particles; and
  forming discrete substantially coated additive particles;
(ii) adding said discrete substantially coated additive particles directly to a polymerization reactor; and
(iii) polymerizing in the presence of said particulate.

Within the scope of the invention, it is contemplated that the particulate comprise an additive core which can be one or more of a variety of compounds, including but not limited to: acid acceptors, processing stabilizers, antioxidants, metal deactivating agents, nucleating agents, pigments, heat stabilizers, light stabilizers, lubricants, antiblock agents, antistatic agents, and slip additives which are capable of enhancing the properties and processability of the polymer. For a typical particulate, within the scope of this invention, the concentration of the additive can range from about 5 wt % to about 85 wt % of the total mass of the particle.

DETAILED DESCRIPTION OF THE INVENTION

The present invention involves at least two basic concepts, (1) the formation of a novel coated particulate prepared such that the particle comprises a core of additive and a coating of a polymer and (2) the incorporation of the novel, formed, coated particulates within a polymer matrix during polymerization in the reactor, wherein the coating of the particulates acts as a barrier between the catalyst system and the additive during polymerization.

The outer coating of the particle can be one or more polyolefins with the monomers having from 2 to 18 carbon atoms, such as propylene or 1-butene. A hydrocarbon wax, such as an emulsifiable polypropylene wax with number average molecular weight of 3000 to 6000, can function as a good outer coating within the scope of this invention.

Specific examples of suitable olefins whose polymers are usable as the outer coating include ethylene, propylene, butene-1, copolymers of ethylene and propylene, copolymers of propylene and butene-1, copolymers of ethylene with at least one other alpha olefin containing from 2 to 18 carbon atoms in the repeating unit and more preferably containing from 2 to 8 carbon atoms.

The selected polyolefin for the outer coating should not cause color formation, staining, or degradation of the base polymer composition in which the coated particulates are being incorporated. The polyolefin of the outer coating should be relatively easy to incorporate into the polymer. More specifically the outer coating should not be reactive with the base polymer. If polypropylene wax is used as the coating material, it (in low concentration) can be left in the final polypropylene composition.

The outer coating material may be either of the natural or synthetic type. Typical examples which are preferred for use in the coating material include emulsifiable hydrocarbon waxes, such as polypropylene, polyethylene, paraffin wax, ester waxes, etc. Other waxes that can be used include mineral waxes, such as montan wax, amide waxes such as ethylene distearamide and ethylene diresorcinolamide, halogenated hydrocarbon waxes, such as chlorinated paraffin waxes, chlorinated naphthalenes and ketone waxes, such as stearone.

The preferred liquid vehicle of the emulsion or dispersion is water because it is cheap and can be disposed of safely and easily. Other materials which can be used include aqueous and non-aqueous dispersion of additives.

The melting point of the coating should be at least high enough so that the outer coating remains solid at room and storage temperatures. It is preferred that the coating material soften or melt at about 100° C. to about 180° C. for convenience of its incorporation during propylene polymerization.

Waxes and wax-like materials can be employed alone or in mixtures of various proportions as the coating layer in the novel particulate. One of the most preferred outer coatings is chemically modified polypropylene because it can be emulsified easily. Maleic anhydride-modified polypropylene waxes are available commercially. The coating can be applied to the additive core by a spraying operation.

One or more coatings can be applied to the additive core through spraying or a variety of other techniques. For example, the additive particles can be fluidized using air. An aqueous emulsion or dispersion of the coating material can then be sprayed onto the fluidized additive particles. Sufficient coating material should be added to the fluidized additive to form the coated particles of additive having desired particle size such as 100 to 8000 micrometers. The additive core can be coated with additional layers to form the particulate. Typical operating conditions for the fluidized bed are shown in Table I.

Following the completion of the coating step, the coated additive particulate is introduced into the polymerization reactor for incorporation into the polymer. This incorporation advantageously occurs without the use of any additional solvents or diluents which need to be removed.

For gas phase fluidized bed polymerization of the olefin, the coated additive particles can be introduced into the fluidized bed in the reactor. Depending on the particular additive and its function, the amounts to be incorporated into the polymer can be varied in accordance with the percentages known to the art to achieve the desired end-use properties of the resin.

In addition to coated additive and monomer, cocatalyst, selectivity control agent and catalyst can be added to the polymerization reactor. It is contemplated that the coated particles be usable for all types of polymerization, e.g. liquid pool polymerization, gas phase polymerization, solvent slurry polymerization, and polymerizations suggested by U.S. Pat. Nos. 4,414,132 and 4,329,253 owned by Shell Oil Company. Sieved fractions of the coated additives can also be added to the polymerization reactor.

Good results have been obtained with polypropylene wax coatings on solid additives for incorporation into polypropylene. These coatings serve to prevent early or inadvertent deactivation of the catalyst by the additive underlying the coating. One important advantage occurs in further melt processing of the polymer by the customer in the extruder: the frictional or applied heat causes the wax coating to melt and thereby promotes dispersion of the additive throughout the resin. Since the polypropylene in the emulsion is predominantly isotactic, it can be left in the final product.

From about 5 to about 85 percent by weight of additive (based on the total weight of the particle) can be used in a coated particle for use in stabilizing a polymer such as a polyolefin. Tests have been conducted using a number of different kinds of additives (coated with a polypropylene emulsion) including Irganox 1010, an additive (for polymers) which is particularly useful as a stabilizer for polypropylene compositions.

The novel coated additives can reduce abrasion of the surfaces of processing machinery, and thereby reduce undue wear and erosion of metal surfaces (including the working parts of the processing equipment) in contact with the final resin composition. Screw and barrel cleaning presents problems in conventional extrusion operations. Metal contamination caused by abrasion is a source of discoloration and degradation of the resins. The use of this novel coated additive reduces the magnitude of this problem. Such coated additives can minimize the dusting tendencies of the finely divided additives and thereby minimize dust explosion hazards.

The coated additives are advantageously used in polymers like polypropylene, polyethylenes including linear low density polyethylene, chlorosulfonated polyethylene, ethylene-propylene copolymer rubbers, ethylene-propylene-diene terpolymers; butyl, butadiene-styrene, silicone, acrylonitrile rubbers, and the like. The coated additives are usable in plastics, for example, polyvinyl chloride polymers and copolymers, polyethylene and copolymers, polypropylene, polyvinylidene chloride, ethylene-carbon monoxide polymers, polystyrene, polyimides, polyamides, polyacetals, acrylonitrile-butadiene-styrene, polycarbonates, polycaprolactone, poly(ethylene oxide), chlorinated polyethylene, polymethyl methacrylate, polysulfones, and the like.

The invention will be described in greater detail in terms of the examples presented below. In no way are these examples intended to limit the invention to the embodiments specifically shown therein. All parts and percentages given are by weight unless otherwise specified.

EXAMPLES

Additives were coated with polypropylene wax from an emulsion by the method described below and then added to a propylene polymerization reactor. The polypropylene coating was used as a barrier between the polymerization catalyst and the additives, therein preventing the deactivation of the catalyst by the additive during polymerization.

The solid additive mixture used was a blend of a low melting phenolic antioxidant (Irganox 1010 from Ciba-Geigy Corporation), distearyl thiodipropionate (DSTDP) and calcium stearate. The fluidized bed coating experiments were conducted using the Wurster type process, described in H. S. Hall and R. E. Pondell, Chapter 7 in "Controlled Release Technologies: Methods, Theory and Applications", Vol. II, A. F. Kydonieus, Ed, CRC Press, Boca Raton, FL, 1980. In this process the coating material is sprayed or atomized through a nozzle onto a fluidized bed of solid core material.

MATERIALS

The composition of the additive mixture was Irganox 1010, DSTDP and calcium stearate in the mass ratio 10:15:5. The mixture was prepared by dry blending the solid stabilizers.

A polypropylene emulsion was used for coating the additives in the fluidized bed. The emulsion was Michem Emulsion 43040, produced by Michelman, Inc., Cincinnati, Ohio. This aqueous emulsion has 40% total solids. Its composition is 60% water, about 32% modified polypropylene wax (Eastman Chemical's Epolene E43—a maleated polypropylene), and about 8% nonionic emulsifier.

COATING OF ADDITIVES

In the coating experiments, a fluidized bed equipped with a spray nozzle in the bottom was used to prepare the coated particles. The coating chamber was 4 inches in diameter at the bottom and 6 inches at the top. The spray nozzle was mounted at the base of this chamber. The aqueous emulsion of polypropylene at ambient temperature was delivered by a peristaltic pump to the spray nozzle. The atomizing air produced a fine spray of the polypropylene emulsion which coated the additives in the fluidized bed. The water rapidly evaporated in the fluidized bed. The operating conditions are shown in Table I. Note the low temperature of the fluidizing air and also the ambient temperature pumping of the aqueous polypropylene emulsion to the spray nozzle. These features allow the coating of even relatively low melting additives.

Three coated stabilizer samples were prepared. 400 gms. additive mixture were taken in the coating chamber. Three levels of coating were applied, resulting in 24%, 50% and 60% w (sample A, B, C respectively) polypropylene coating in the final capsule. The fluidizing air inlet temperature was 44°-52° C. and outlet 24°-28° C. After 46 minutes of coating, sample A was withdrawn from the fluidized bed and the coating continued. After 89 minutes sample B was withdrawn. To prepare sample C the coating continued for another 70 minutes.

POLYMERIZATION

Batch liquid propylene polymerizations (bulk) were conducted in a one-gallon autoclave (2.7 liter propylene charge) at 67° C. for one hour using a catalyst. The following injections were made sequentially to the reactor containing propylene and hydrogen. First triethyl aluminum (TEA) cocatalyst (2.1 millimole) and diisobutyl dimethoxysilane selectivity control agent or SCA (50 microliter) were mixed. The catalyst slurry (0.3 ml in mineral oil) was added to the TEA/SCA mixture. After waiting 20 minutes, the final mixture was injected into the reactor. After 2 minutes the coated additive, suspended in mineral oil, was injected.

The catalyst is prepared by halogenating a magnesium compound of the formula MgR'R" (where R' is an alkoxide or aryloxide group or halogen; and R" is an alkoxide, aryloxide, alkyl carbonate or halogen) with a halide of tetravalent titanium in the presence of an electron donor, contacting the halogenated product with a tetravalent titanium halide, washing it to remove unreacted Ti compound and electron donor, contacting the halogenated product with a tetravelent titanium halide, washing it with an inert solvent to remove unreacted Ti compounds and recovering the solid product.

It is contemplated that other organoaluminum compounds be usable herein, for example an organoaluminum compound selected from the group comprising diethyl aluminum chloride, ethyl aluminum dichloride, and ethyl aluminum sesquichloride, and that other selectivity control agents may be usable herein such as a selectivity control agent selected from the group comprising: paraethoxy benzoate, ethyl paratoluate, paramethoxy ethyl benzoate, phenyl triethoxysilane and 2,2,6,6-tetramethyl piperidine.

STEREOSELECTIVITY AND STABILITY TEST PROCEDURE

Xylene Solubles (XS) of the polypropylene were determined as the percentage of material remaining soluble after cooling a solution of polypropylene in xylene from its boiling point to room temperature. XS is a measure of stereoregularity or isotacticity of the polypropylene.

The thermo-oxidative stability of the polypropylene was determined by both oven aging and oxidative induction time (OIT) measurements after compression molding the polypropylene into 10 mil thick specimens. For oven aging these 2 inch×2.5 inch specimens were placed in a forced circulation hot air oven maintained at 150° C. The aging procedure followed the guidelines of ASTM D3012. The samples were inspected (five days a week) and failure was indicated by characteristic powdery disintegration and brittleness of the polypropylene.

For OIT measurement, about 5 mg of the compression-molded sample was crimped in a Difference Scanning Calorimeter (Perkin-Elmer model DSC-7). The sample was heated to the test temperature under nitrogen, and then the nitrogen gas was replaced by oxygen. From this time (t=0) onward, scanning was done in the time mode. A tangent was drawn to the exothermic oxidation peak. The intersection of this tangent with the initial baseline, measured from t=0, gave the oxidative induction time or OIT. Note that higher oven life or OIT values indicate greater oxidative stability of the polymer.

RESULTS

The data in Table II show that the polypropylene produced in the reactor by the inventive method and good yield and stereoselectivity (as indicated by low xylene solubles) and also had significant level of thermo-oxidative stability, as shown by both oven aging and oxidative induction time (OIT) of the polypropylene, compared to unstabilized polypropylene. The polypropylene produced was of high molecular weight, as indicated by the melt flow rate data.

Thus, it can be seen that the process of the present invention can be advantageously employed to efficiently produce a resin containing dispersed additives, avoiding the further extrusion pelletization of the resin. This means that polymerization to produce a highly stable product can be accomplished with an expenditure of a minimum of man-hours and minimal equipment costs compared with known techniques.

CONCENTRATE

The production of concentrates or masterbatches of stabilizer, pigments and other additives is an important segment of the polymer industry. Before fabrication, the concentrates (containing additive) are blended with the polymer to achieve a desired final additive concentration. The current concentrate manufacturing technology involves extrusion (often with expensive twin-screw equipment) or other mechanical mixing process. Screw and barrel cleaning, maintenance problems, energy cost, heat sensitivity of some additives and pelletization often present problems in such operations. This invention presents a lower energy, non-extrusion route to additive or pigment concentrate preparation.

The fluidized bed coating of the additives produced three concentrates with varying levels of additives in a carrier of polypropylene wax (samples A, B, C). The additive concentration in the masterbatch was controlled by the coating layer thickness.

Concentrates suitable for polyethylene resins can be prepared by fluidized bed coating of additive or pigment by polyethylene wax or other polyethylene resin.

TABLE I

| | | Operating conditions for fluidized bed coating of additives | | | | |
|---|---|---|---|---|---|---|
| Coated Sample | % PP in Capsule | Fluidizing air temp (°C.) In | Fluidizing air temp (°C.) Out | Fluidizing air flow rate (SCFM) | Pump (RPM) | Atomizing Air Pressure (psi) | Atomizing Air Flow rate (SCFH) |
| A | 24 | 52 | 28 | 19 | 9 | 16 | 100 |
| B | 50 | 49 | 26 | 19 | 9 | 16 | 85 |
| C | 60 | 44 | 24 | 19 | 9 | 16 | 85 |

TABLE II

| | Propylene Polymerization[a] Using Coated Additives and Properties of Resultant PP | | | | | | |
|---|---|---|---|---|---|---|---|
| Example | Coated Additive[b] used (See Table I) | Polymer Yield, kg PP/g cat. | XS (w %) | Bulk density (g/cc) | Melt flow[c] (g/10 min) | Oven Life (days) at 150° C. | OIT (mins.) at 190° C. |
| 1 | C | 11.4 | 4.2 | 0.37 | 5.0 | 16 | 23.7 |
| 2 | B | 12.5 | 4.4 | 0.37 | 4.9 | 39 | 22.3 |
| 3 | A | 13.4 | 4.2 | 0.37 | 3.9 | 91 | >40 |
| 4 | B | 7.1 | 3.9 | 0.35 | 12.1 | 22 | 7.9 |
| 5 | A | 7.7 | 4.0 | 0.36 | 7.3 | 89 | 32.1 |
| Unstabilized PP | — | — | — | — | 3.0 | 0.3 | 1.8 |

[a]32 mmol $H_2$ was used in all polymerization runs
[b]1.0 gm. coated additive was used in examples 1-3; 2 gm. coated additive was used in examples 4 and 5
[c]Measured by ASTM D-1238 condition L.

What is claimed is

1. A process for providing in-reactor stabilization of a polyolefin during a polymerization reaction comprising the steps of:
   (a) forming a particulate adapted for use in polyolefin polymerization reactions, by the steps consisting of
      (i) forming a polyolefin emulsion or dispersion;
      (ii) fluidizing additive particles;
      (iii) spraying the emulsion or dispersion on the fluidized additive particles;
      and forming discrete substantially coated additive particles;
   (b) adding said discrete substantially coated additive particles to a polymerization reactor and polymerizing an olefin with a magnesium supported titanium halide/aluminum alkyl catalyst system wherein said system comprises
      (i) a procatalyst component obtained by halogenating a magnesium compound of the formula MgR'R" (wherein R' is an alkoxide or aryloxide group or halogen; and R" is an alkoxide, alkyl carbonate, aryloxide, or halogen) with a halide of tetravalent titanium in the presence of an electron donor, contacting the halogenated product with a tetravalent titanium halide, and recovering the solid product;
      (ii) a cocatalyst component comprising an organoaluminum compound; and
      (iii) a selectivity control agent.

2. The process of claim 1 wherein the olefin polymerization reaction is for the polymerization of an olefin having 2-18 carbon atoms.

3. The process of claim 2 wherein the olefin polymerization reaction is a 1-butene polymerization reaction.

4. The process of claim 2 wherein the olefin polymerization reaction is a propylene polymerization reaction.

5. The process of claim 1 wherein the additive used to form said particulate is a member of the group:
1,3,5-trimethyl-2,4,6-tris(3,5-di-tert-butyl-4-hydroxybenzyl) benzene; octadecyl 3-(3',5'-di-tert-butyl-4'-hydroxyphenyl)propionate; tetrakis[methylene (3,5-di-tert-butyl-4-hydroxyhydrocinnamate)] methane; tris[3,5-di-t-butyl-4-hydroxybenzyl)isocyanurate; 3,5-di-tert-butyl-4-hydroxyhydrocinnamic acid triester with 1,3,5-tris(2-hydroxyethyl)-s-triazine-2,4,6(1H,3H,5H)-trione; 1,3,5-tris(4-tert-butyl-3-hydroxy-2,6-dimethylbenzyl) 1,3,5-triazine-2,4,6-(1H,3H,5H)-trione; bis-[3,3-bis(4'hydroxy-3'tert-butyl-phenyl)-butanoic acid]-glycolester; 2,2'-methylenebis-(4-methyl-6-tertiarybutyl-phenol)-terephthalate; 2,2-bis[4-(2-(3,5-di-tert-butyl-4-hydroxyhydrocinnamoyloxy)) ethoxyphenyl]propane; calcium bis[monoethyl(3,5-di-tert-butyl-4-hydroxybenzyl)phosphonate]; 1,2-bis(3,5-di-tert-butyl-4-hydroxyhydrocinnamoyl)hydrazine; and 2,2'-oxamidobis-[ethyl 3-(3,5-di-tert-butyl-4-hydroxyphenyl)propionate].

6. The process of claim 1 wherein the polyolefin in the emulsion used to form said particulate has 2-18 carbon atoms per repeat unit.

7. The process of claim 1 wherein said fluidization of the bed of solid additive is performed using a member of the group consisting of air, inert gas, and mixtures thereof.

* * * * *